(12) United States Patent
Lindsay et al.

(10) Patent No.: US 9,852,401 B2
(45) Date of Patent: Dec. 26, 2017

(54) PROVIDING ADDITIONAL EMAIL CONTENT IN AN EMAIL CLIENT

(75) Inventors: David Bruce Lindsay, Kirkland, WA (US); Baskaran Dharmarajan, Palo Alto, CA (US); Geoffrey M. Clark, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 13/079,123

(22) Filed: Apr. 4, 2011

(65) Prior Publication Data

US 2012/0254321 A1 Oct. 4, 2012

(51) Int. Cl.
*G06F 15/16* (2006.01)
*G06Q 10/10* (2012.01)

(52) U.S. Cl.
CPC .................. *G06Q 10/107* (2013.01)

(58) Field of Classification Search
CPC ..... H04L 51/046; H04L 51/06; H04L 51/063; H04L 51/066; H04L 51/08; H04L 51/10; H04L 51/18
USPC ........................................................ 709/206
See application file for complete search history.

(56) References Cited

U.S. PATENT DOCUMENTS

| 6,457,045 | B1* | 9/2002 | Hanson et al. ............... 709/206 |
| 6,961,750 | B1 | 11/2005 | Burd et al. |
| 7,031,968 | B2 | 4/2006 | Kremer et al. |
| 7,234,114 | B2 | 6/2007 | Kurtz et al. |
| 7,533,386 | B2 | 5/2009 | Coker et al. |
| 8,875,029 | B1* | 10/2014 | Naidu .................. G06Q 10/107 715/752 |
| 2001/0025300 | A1* | 9/2001 | Miller et al. .................. 709/206 |
| 2002/0087631 | A1* | 7/2002 | Sharma ......................... 709/203 |
| 2003/0110225 | A1* | 6/2003 | Billadeau ............... G06Q 30/02 709/206 |
| 2003/0122922 | A1* | 7/2003 | Saffer et al. ............... 348/14.01 |
| 2003/0163819 | A1* | 8/2003 | Lee et al. ......................... 725/61 |
| 2004/0201711 | A1* | 10/2004 | Lopaz ................ H04N 1/00408 348/211.99 |
| 2004/0249846 | A1* | 12/2004 | Randall et al. ............... 707/102 |

(Continued)

OTHER PUBLICATIONS

"Hotmail: Do more from your inbox", Retrieved Date: Feb. 23, 2011, http://explore.live.com/windows-live-hotmail-social-network-using.

(Continued)

*Primary Examiner* — El Hadji Sall
*Assistant Examiner* — Blake Rubin (57) ABSTRACT

One or more techniques and/or systems are disclosed for providing additional content in an email. An email service can receive the email at an email server. Prior to the email being sent to an email client, metadata for a parameter used to retrieve the additional content is identified and collected. The collected metadata is sent to the email client used by the intended recipient of the email (e.g., on a smart phone). When the user attempts to access the email, the email server can respond by sending script code to the email client, which, in combination with locally stored metadata retrieved from the email, provides the additional content in the email. In this manner, an email regarding a package, for example, can include not only a tracking number but also a status of the delivery of the package, where the status may be different/updated each time the email is accessed.

20 Claims, 9 Drawing Sheets

(56) References Cited

U.S. PATENT DOCUMENTS

| | | | |
|---|---|---|---|
| 2004/0267725 A1* | 12/2004 | Harik | G06F 17/30864 |
| 2005/0076051 A1* | 4/2005 | Carobus | G06Q 30/02 |
| 2005/0222903 A1* | 10/2005 | Buchheit | G06Q 10/107 |
| | | | 705/14.54 |
| 2005/0246752 A1* | 11/2005 | Liwerant et al. | 725/109 |
| 2006/0026067 A1* | 2/2006 | Nicholas | G06Q 30/00 |
| | | | 705/14.58 |
| 2006/0069990 A1 | 3/2006 | Yozell-Epstein et al. | |
| 2006/0101119 A1* | 5/2006 | Qureshi | G06Q 10/107 |
| | | | 709/206 |
| 2007/0011258 A1* | 1/2007 | Khoo | 709/206 |
| 2007/0112627 A1* | 5/2007 | Jacobs | G06Q 10/107 |
| | | | 705/14.46 |
| 2007/0244977 A1* | 10/2007 | Atkins | G06Q 10/107 |
| | | | 709/206 |
| 2008/0183582 A1* | 7/2008 | Major | G06Q 30/0277 |
| | | | 705/14.73 |
| 2008/0183587 A1* | 7/2008 | Joo et al. | 705/14 |
| 2008/0294729 A1* | 11/2008 | Ionescu et al. | 709/206 |
| 2009/0006529 A1 | 1/2009 | Singh et al. | |
| 2009/0106840 A1* | 4/2009 | Dreymann | G06F 21/56 |
| | | | 726/23 |
| 2009/0119173 A1* | 5/2009 | Parsons | G06Q 10/107 |
| | | | 705/319 |
| 2009/0254529 A1* | 10/2009 | Goldentouch | 707/3 |
| 2009/0262668 A1* | 10/2009 | Hemar et al. | 370/260 |
| 2010/0017289 A1* | 1/2010 | Sah et al. | 705/14.49 |
| 2010/0030734 A1* | 2/2010 | Chunilal | G06F 17/30867 |
| | | | 707/770 |
| 2010/0205258 A1* | 8/2010 | Smelyansky | H04L 51/36 |
| | | | 709/206 |
| 2010/0250650 A1 | 9/2010 | Allen | |
| 2010/0287467 A1 | 11/2010 | Sylthe et al. | |
| 2011/0166932 A1* | 7/2011 | Smith | G06Q 30/02 |
| | | | 705/14.53 |
| 2011/0179362 A1* | 7/2011 | Craddock et al. | 715/752 |
| 2011/0185024 A1* | 7/2011 | Ramarao et al. | 709/206 |
| 2011/0208592 A1* | 8/2011 | Golder | G06Q 10/107 |
| | | | 705/14.66 |
| 2011/0252103 A1* | 10/2011 | Beyer | G06Q 10/107 |
| | | | 709/206 |
| 2011/0295689 A1* | 12/2011 | Brady | G06Q 30/0241 |
| | | | 705/14.54 |
| 2012/0010995 A1* | 1/2012 | Skirpa et al. | 705/14.49 |
| 2012/0011449 A1* | 1/2012 | Sasson et al. | 715/752 |
| 2012/0110515 A1* | 5/2012 | Abramoff et al. | 715/854 |
| 2012/0124143 A1* | 5/2012 | Chung et al. | 709/206 |
| 2012/0150975 A1* | 6/2012 | Kallman | G06Q 10/10 |
| | | | 709/206 |
| 2012/0174149 A1* | 7/2012 | Reynolds | G06Q 30/02 |
| | | | 725/31 |
| 2012/0253916 A1* | 10/2012 | Ayloo | G06Q 30/02 |
| | | | 705/14.35 |
| 2013/0054354 A1* | 2/2013 | Kunz | G06Q 30/0241 |
| | | | 705/14.49 |
| 2015/0156151 A1* | 6/2015 | Sheory | H04L 51/10 |
| | | | 715/236 |

OTHER PUBLICATIONS

"Hotmail", Retrieved Date: Feb. 23, 2011, http://en.wikipedia.org/wiki/Hotmail.

"Client Side—Active View Change", Retrieved at <<http://demos.devexpress.com/ASPxSchedulerDemos/ClientSide/ChangeActiveView.aspx >>, Retrieved Date: Jan. 21, 2011, p. 1.

* cited by examiner

PROVIDING ADDITIONAL EMAIL CONTENT IN AN EMAIL CLIENT

BACKGROUND

Email is used to send digital messages over the Internet or other computer network(s) from a sender, who may author the message, to one or more recipients. Further, emails can be used to send attached digital documents and/or files to the recipients. Typical email systems and services store an email message sent by the sender and forward it to the one or more recipients at an appropriate time. Email systems can comprise web-based email (e.g., accessed using a browser over the Internet), enterprise-based systems (e.g., comprising servers managed by a company on a computer network), Internet service provider-based systems (e.g., provided by an ISP), and others. Further, emails may be accessed using an online service, such as via a browser, a client-based email application (e.g., resident on a client device), and/or a combination (e.g., accessing a web-based email service using a client email application).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Typically, emails comprise known protocols, such as sender, recipient, body, etc., and do not provide for additional information. However, in some instances web-based email services may be able to provide a more rich and interactive experience to recipients of an email, for example, as they can utilize active script in a browser that may be able to connect with the email service provider to add content to an email. This is typically accomplished, however, by using a proprietary web-based email service where proprietary protocols are used for rendering emails.

For example, a proprietary web-based email service can receive an email, such as on one or more back-end email servers. When a web-based email client is opened by/for the recipient of the email, a front-end server may retrieve the email from the back-end server, for example, and examine it for content on-the-fly (e.g., at a time the email is rendered). If the content indicates possible additional content, such as updated information, the email is scraped and the additional content is retrieved, on-the-fly. The email is rendered in the proprietary web-based email client, with the additional content. However, it is believed that this type of additional content provision is not available for email clients that are not web-based (e.g., client-based, such as on a mobile device), and/or not part of a proprietary web-based email system.

Accordingly, one or more techniques and/or systems are disclosed that provide for emails to be examined before they are rendered in an email client. Information may be identified in the email that indicates additional information, such as up-to-date information (e.g., package tracking data), attachment previews, and/or interactive content, for example, which can be provided in the email at time of rendering. The identified information can be stored locally on the client device comprising the email client, and when the email is actually accessed/rendered, the additional content can be provided in the email, such as by retrieving it from a partner content provider indicated by/within the identified information. It will be appreciated that additional content and/or the like as used herein is not meant to be limited to an attachment and/or static content, for example, but is meant to comprise, for example, interactive and/or up-to-date content/material as well that may, for example, supplement and/or replace static/stale content.

In one embodiment for providing additional content in an email accessed by an email client, metadata can be identified in the email that has been received at an email server. In this embodiment, the metadata can be indicative of a parameter that is used to retrieve the additional content for the email. Further, prior to the email being accessed by the email client, the metadata can be provided to the email client that is associated with an intended recipient of the email (e.g., email client comprises an account for the email address of the recipient). Additionally, in response to receiving an indication that the email client is accessing the email, script code can be returned to the email client. The script code can provide the additional content based, at least in part, upon the parameter indicated by the metadata retrieved from the email.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for creation of new content that may present more information about an email's contents in an email client, such as resident on a users device (e.g., PC, laptop, mobile device, etc.). For example, an email may comprise information that was up-to-date at a time the email was sent, but an intended recipient of the email may not actually open or receive the email until a later point in time. In this example, the contents of the email may no-longer by up-to-date or otherwise stale by the time the recipient reads the email. Up-to-date content can be added to the email at the time the recipient reads the email, and/or additional content may be provided in the email, such as interactive content, media, attachments, etc.

Figure 1:
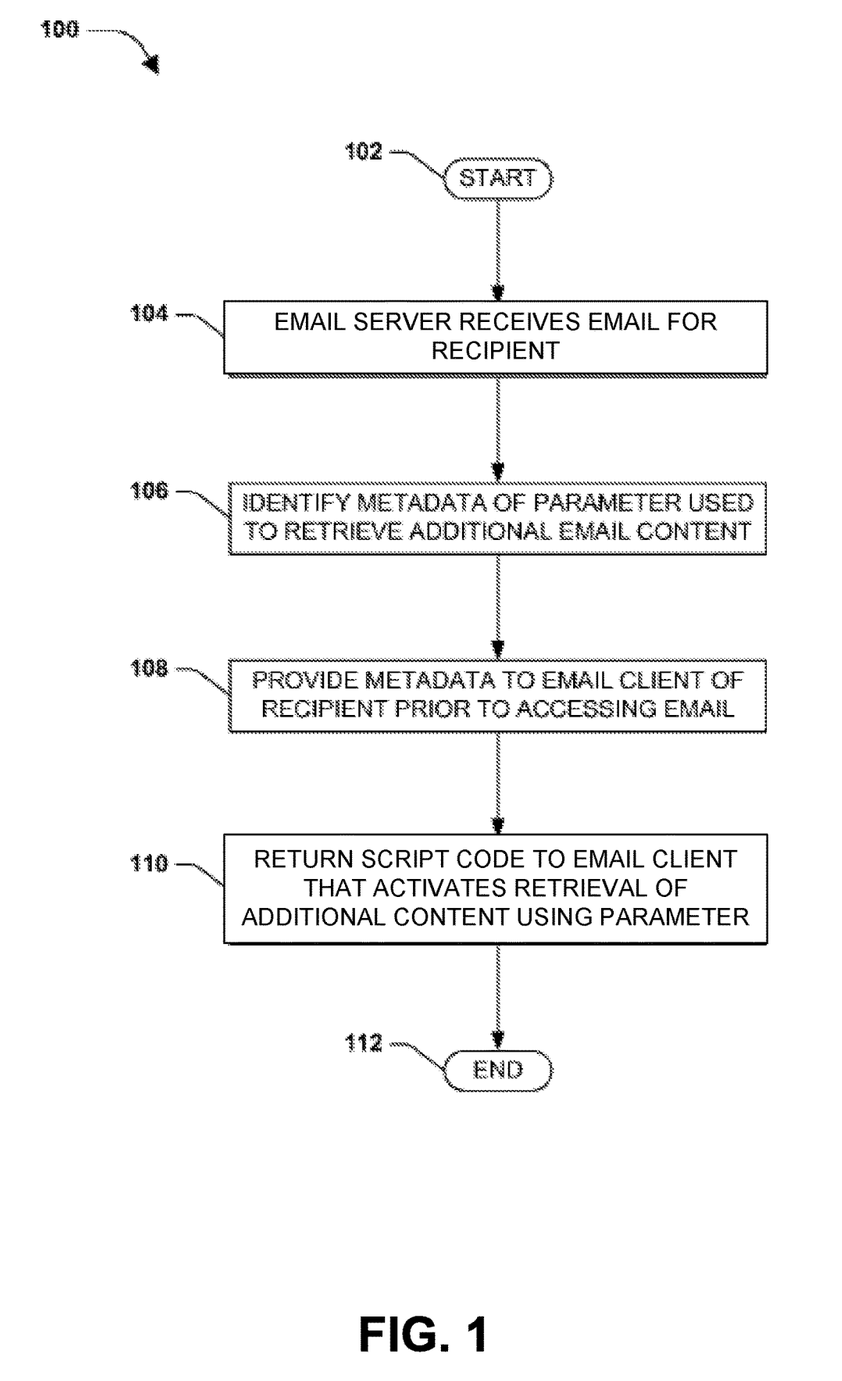
FIG. 1 is a flow diagram illustrating an exemplary method for providing additional content in an email accessed by an email client.

FIG. 1 is a flow diagram illustrating an exemplary method 100 for providing additional content in an email accessed by an email client. The exemplary method 100 begins at 102 and involves an email server receiving an email for a recipient, at 104. For example, web-based email services can provide email services to a user through a browser, such as by navigating to a website for the email service, and/or by routing email traffic to a third-party email client or aggregation service. Web-based email services (e.g., and client-based email services) can utilize email servers for receiving emails intended for users/subscribers of the email service, such as sent by users of a same email service or a different email service.

At 106 in the exemplary method 100, metadata that is indicative of a parameter used to retrieve the additional content for the email is identified in the email received at the email server. For example, an email can comprise a variety of content, such as a header (e.g., comprising a sender, recipient(s), subject, etc.), body (e.g., text of email, links, graphics, etc.), and an attachment (e.g., files, images, video, etc.), etc. Further, in this example, the body of the email, for example, can comprise information that may be used to gather additional content, such as a uniform resource identifier (URI) (e.g., a link to a webpage, server, etc.), a user name, and/or terms that may be applied to a search query. In one embodiment, information in the email body, for example, may be identified as a parameter for retrieving additional content, and the metadata associated with the identified parameter can be collected.

It will be appreciated that additional content is meant to be construed broadly and not limited the particular examples/embodiments provided herein. For example, additional content can comprise content that is not found in an email as originally authored. For example, additional content may comprise contents of an attachment displayed in the email body, and/or content retrieved from a remote server identified by a URI in the email. In one embodiment, the additional content may comprise updated content, such that the updated content replaces static/stale content found in the email. For example, package tracking information may be updated with current tracking information in the email; and/or updated news content may replace static/stale content in the email. In one embodiment, the additional content may comprise interactive content, with which a user may interact. For example, the additional content may comprise a type of "mini-website" that is rendered in the email body allowing the user to interact with the additional content (e.g., click around/through the (offerings of the) mini-website.

At 108, prior to the email being accessed by an email client, the collected metadata is provided to the email client that is associated with the recipient of the email. For example, the recipient of the email may utilize one or more email clients (e.g., local client-based email application, enterprise-based email client, and/or web-based email client, etc.) to send, receive, and/or manage emails. As an illustrative example, an email address for the recipient can comprise a local-part, such as a username associated with the recipient's email client, and a suffix, such as a domain name (e.g., "example.com") to which the email can be sent.

Further, as an example, the recipient may access an email from more than one email client, which may be respectively registered with the email server for the recipient. As an illustrative example, the user may use a web-based email service to access emails sent to the email service domain (e.g., webemail.com), and may also use a local client-based application, which is used to access an enterprise-based email server (e.g., of domain "recipientcompany.com"), to also access the web-based email service (e.g., by setting up a Post Office Protocol (POP) account in the local client-based application). In this embodiment, for example, before the recipient loads the email to the email client (e.g., reads the email) the email server can send the collected metadata for the email to the email client.

At 110 in the exemplary method 100, when the email server receives an indication of the email client accessing the email (e.g., the recipient clicks-on, launches or otherwise opens the client to read email), script code that provides the additional content can be returned to the email client. Further, the provision of the additional content by the script code is based, at least in part, on the parameter indicated by the metadata. For example, when the recipient opens their email client, and/or updates/refreshes the email client to check for new emails, the email server may be asked to send the email. Upon receiving the request for the email, for example, the script code can be sent to the client by the email server. The script code can utilize the metadata that was provided to the email client to identify the additional content, for example, and the additional content (e.g., content that was not provided in the email as first authored) can be provided to the recipient in the email rendered by the email client. It will be appreciated that script code and/or the like is meant to be interpreted broadly, such as in creating views that are active or active views for additional content. For example, an extensible email object (EEO) could be created (e.g., as described below) if a link to a web (or other type of) video is received, where an active view to interact with the video could be generated by a video player (e.g., to provide forward, backward, play, etc. capabilities) so that the content of the email comprises more than just a URL that could be clicked on, etc. to link to the video and view the same. In this manner, script code and/or the like as used herein are envisioned as comprising such implementations as well.

Figure 2:
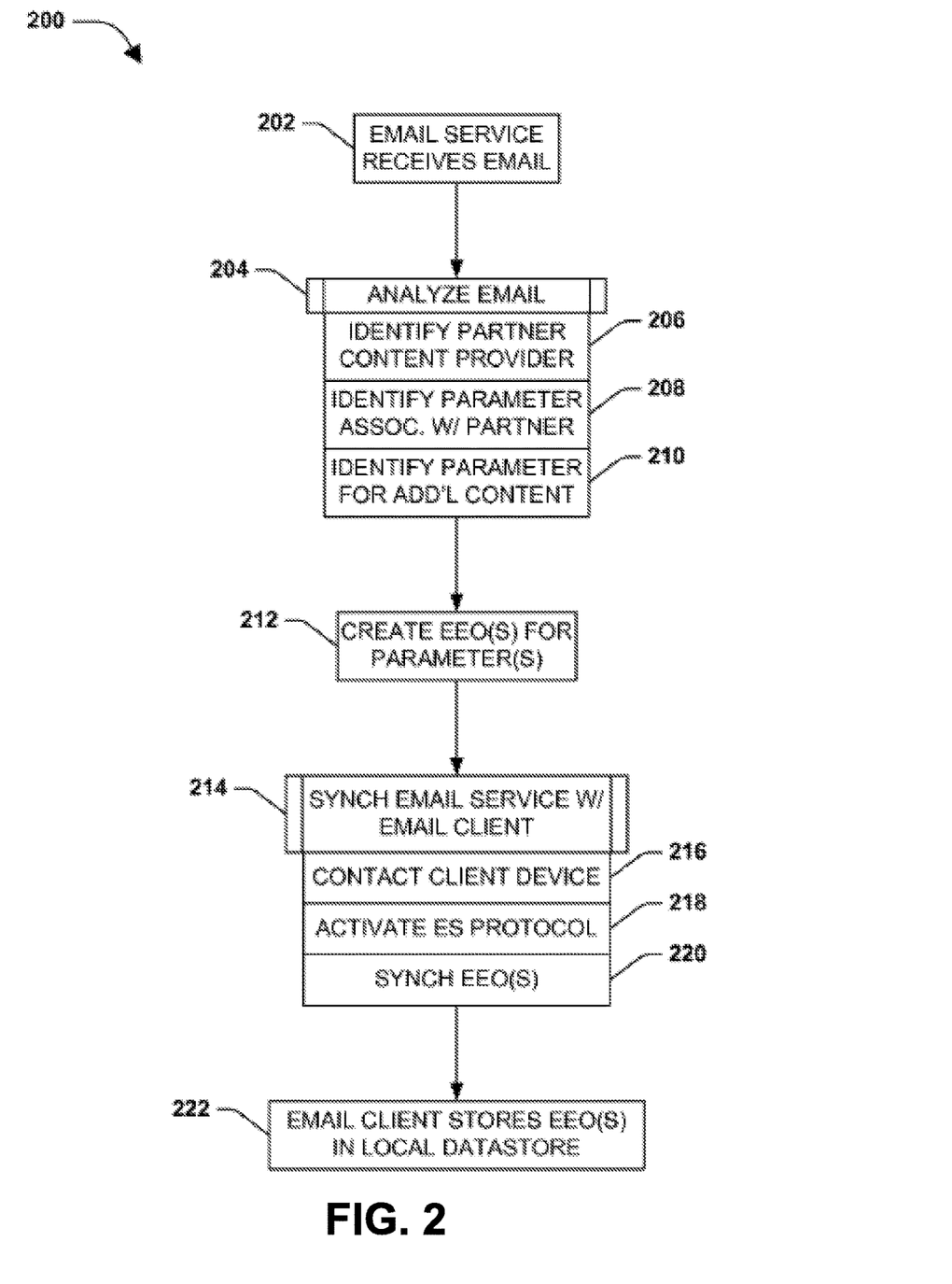
FIG. 2 is a flow diagram illustrating an example embodiment where of one or more portions of one or more techniques described herein may be implemented.

FIG. 2 is a flow diagram illustrating an example embodiment 200 of one or more portions of one or more techniques described herein. At 202, an email service receives an email, such as one that is intended for a particular recipient. For example, an email that is sent to the recipient can be addressed to a domain of the email service (e.g., comprising a mailbox provider for the recipient). Further, the email service comprising the domain name (e.g., target host) may utilize one or more email servers to receive emails for the email service. As an example, the email sent to the recipient can be received at one of the email servers for the email service hosting the domain address for the email.

At 204 in the example embodiment 200, the email can be analyzed to identify metadata for parameters in the email that may be associated with additional content, such as content not found in the email as sent. In this embodiment, identifying the metadata can comprise analyzing the email to identify a partner content provider, at 206. For example, a partner content provider can comprise an enterprise that may provide additional content, and/or updated content for the email when the email is accessed by an email client (e.g., when the recipient reads the email).

In one embodiment, analyzing the email to identify the partner content provider can comprise identifying a universal resource identifier (URI) used for retrieving the additional content from the partner content provider. As an illustrative example, the partner content provider may comprise the United States Postal Service (USPS), and the email may comprise a shipping notification for a package. In this example, the body of the email may comprise a notification that the package has been shipped, and a link (e.g., universal resource locator (URL)), such as to a website for the partner content provider, which the recipient may use to find out more information about the package (e.g., shipping status/package location). The link can be identified as a parameter that may be associated with additional content (e.g., the partner content provider), for example.

At 208 in the example embodiment 200, identifying the metadata can comprise analyzing the email to identify a parameter associated with the partner content provider. For example, the partner content provider may comprise a news organization, and the email may describe (e.g., or include) a news story. In this embodiment, for example, the parameter associated with the partner content provider can comprise the news story, from which metadata (e.g., comprising information about the news story) can be identified. In this way, for example, the additional content provided by the partner content provider may comprise an updated version of the news story that can be provided to the recipient/user when the email is actually opened/read.

In one embodiment, analyzing the email to identify metadata associated with the partner content provider can comprise identifying the parameter that indicates the additional content to be retrieved from the partner content provider. As another example, the parameter associated with the partner content provider may comprise a tracking number for a package sent by the USPS. In this example, the additional content provided by the partner content provider may comprise an updated shipping status for the package.

At 210 in the example embodiment 200, identifying the metadata can comprise analyzing the email to identify one or more parameters that may be used to display the additional content. For example, the email may comprise one or more attachments, such as documents, images, videos, or other media. In this example, the attachment may comprise a parameter for which metadata may be collected. Further, the metadata may be used when opening the email, such that the attachment may be previewed directly in the email, for example, without having to open the attachment.

As another example, in this embodiment, a parameter may be embedded in the email from a website that can provide up-to-date information and content that the recipient may interact with in the email. In this example, the message may comprise a type of "mini-website" in the email client inbox. Further, in this example, when the recipient opens the message they may be able to interact with it as if they have gone to the website, such as directly within the email client, without having to navigate to another site (e.g., through a browser). Further, an additional content display parameter may comprise information for displaying the additional content, such as content size and dimension of screen space used to display the additional content in the email.

At 212 in the example embodiment 200, an extensible email object (EEO) can be created for a parameter, where the EEO can comprise at least some of the metadata identified for the parameter. In one embodiment, an extensible object may be used to extend existing runtime classes with new functionality and/or to add new state to an object. In this way, for example, the EEO may be used by the email client to help provide the additional content in the email, such as in an "active view" for the email.

At 214, in the example embodiment 200, the email service can synchronize with the email client, such as on a client device comprising the email client. For example, the email client may be configured to periodically contact the email service to send and/or receive emails. Further, the email service may periodically contact the email client, such as at 216, to provide new emails, and/or to synchronize data. In one embodiment, an exchange synchronization protocol may be used to synchronize data between the email service and the email client. As an example, an exchange synchronization protocol can utilize a data synchronization service that enables mobile device users to access their e-mail, calendar, and contacts and retain access to this information while they are offline. That is, for example, the information can be synchronized between the exchange synchronization service and the mobile device (e.g., or a personal computer and a mobile device), and retained in both locations.

At 218, the exchange synchronization protocol can be activated. In one embodiment, providing the metadata to the email client can comprise synchronizing the metadata to a client device comprising the email client using the exchange synchronization protocol. At 220, providing the metadata to the email client can comprise providing one or more EEOs to the email client during an exchange synchronization event between the email client and the email server. For example, an extensible object may be synchronized between the server and client, such that recent/updated data is shared between both. In this embodiment, for example, the EEO is synchronized to the email client, where the EEO can comprise the parameters for newly received emails to the email service. At 222 in the example embodiment, the one or more EEOs are stored locally on the client device, such as in a local data store for the email client.

Figure 5:
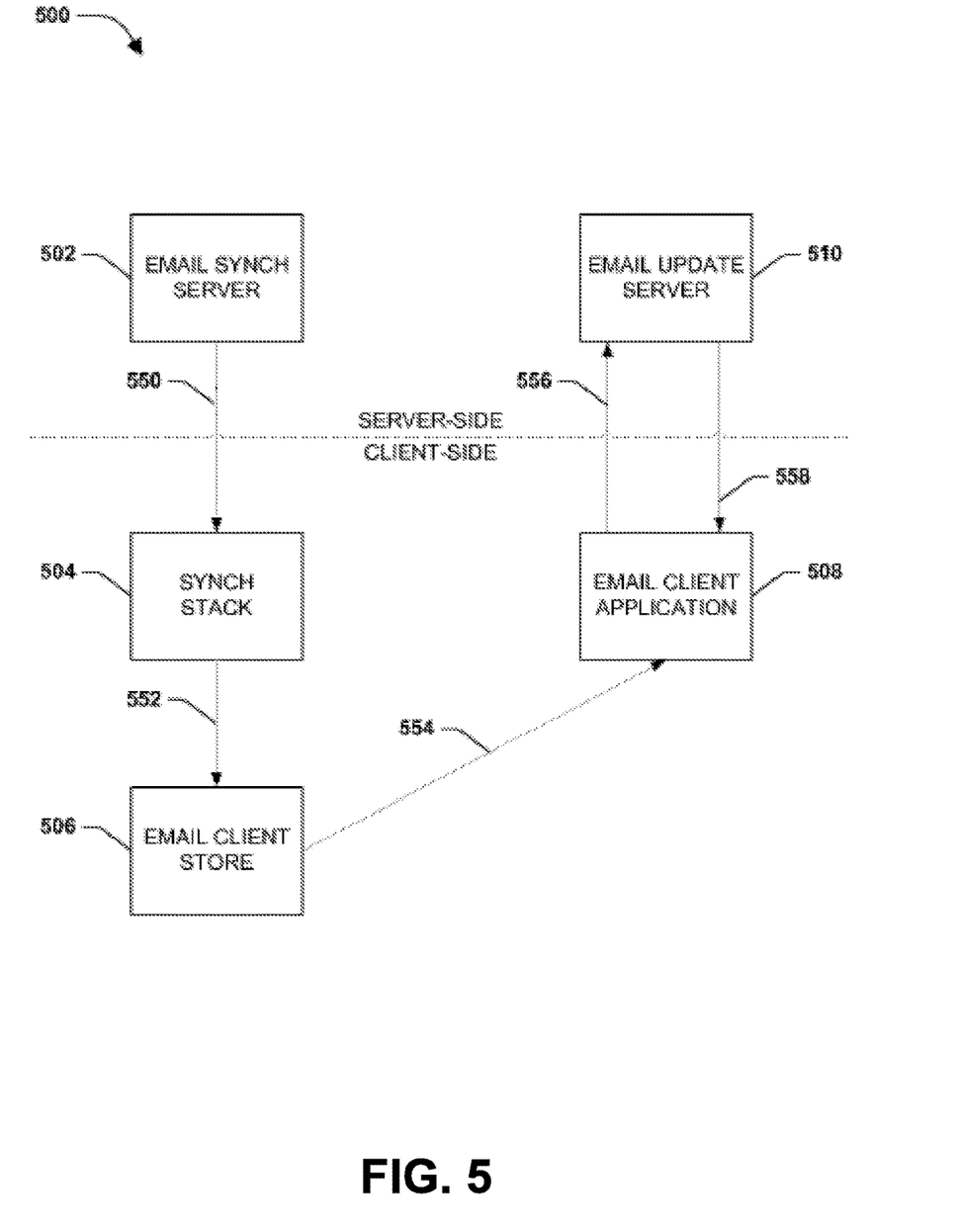
FIG. 5 illustrates an example embodiment where or more techniques described herein may be implemented.

By way of illustration, FIG. 5 illustrates an example embodiment 500 where or more techniques described herein may be implemented. As an illustrative example, in FIG. 5, an email service may comprise an email synchronization server 502, resident on a server side of a synchronization process. In this example 500, the email synch server 502 can send EEOs 550 to a synchronization stack 504, such as coupled with the email client. The synchronization stack 504 may also be coupled with one or more other applications resident on the client device that may utilize the exchange synchronization protocol.

In this example embodiment, the synchronization stack 504 can receive the EEOs (e.g., and other synchronization objects) on the client side of the synchronization process. The synchronization stack 504 may reside on the client device comprising the email client, which can comprise local storage used as an email client storage location. In this example, the EEOs can be sent 552 to the email client store 506 on the client device, for example, before the email (from which the EEOs have been generated) is opened/accessed by the email client.

In one embodiment, the synchronization may comprise providing an application programming interface (API) to the email client. In this embodiment, the API may be stored locally on the client device (e.g., at the email client store 506 of FIG. 5). Further, the API may be used by the email client to retrieve script code used to provide the additional content from a partner content provider. Additionally, the API can utilize the metadata, for example indicative of the parameter identified in the email, which may also be stored in the local email client store. As an example, the API may be provided by a partner content provider, and configured to retrieve updated additional content for an email, such as in an active view of the email on the email client.

Figure 3:
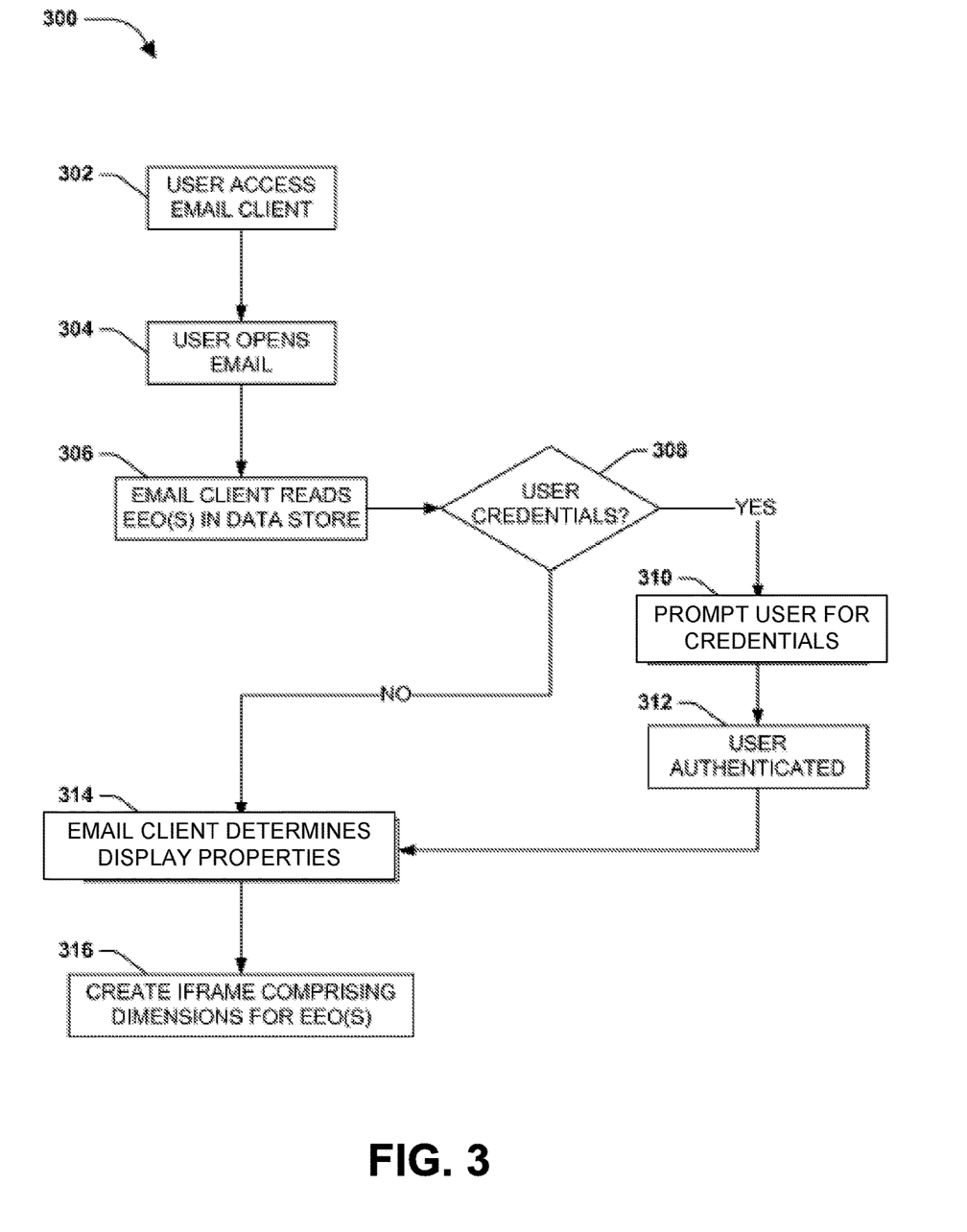
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, a user of an email client accesses the email client, such as by opening the email client, and/or activating a "retrieve new emails" function in the email client. As an example, an email client may comprise a local application resident on a user's device, such as a mobile device or personal computer. In this example, the user may open the email client, and the email client may automatically begin retrieval of emails (e.g., depending on settings) and/or the user may prompt the email client to retrieve emails (e.g., manually).

At 304, the user opens or accesses the email using the email client (e.g., clicks on the email). At 306, the email client reads metadata comprised in EEOs from a local data store, for example. As an illustrative example, when the email client synchronizes data with an email server, such as through an exchange synchronization protocol, a well defined schema of message properties is sent that defines what properties the message does and does not have. The metadata is processed in a way, in this example, that can be readily stored in a client side local data store, and easily read and understood by the email client.

In this example embodiment 300, when the email client reads the metadata for the email message it can determine what may be needed to render the additional content, such as in an active view, in the email. The email client may determine whether user credentials are needed to retrieve the additional content, at 308, if the metadata for a parameter indicates that authentication is used for the additional content. For example, if the additional content comprises personally sensitive information linked to a particular user, the partner content provider may ask the recipient to authenticate that they are the intended user. If user credentials are needed (YES at 308) the email client can prompt the user to enter their credentials, at 310.

If user credentials are not needed (NO at 308), or the user is authenticated, at 312, the email client can determine display properties for the email, at 314. It will be appreciated that the user authentication is not limited to the example embodiment, described above. For example, the email client may temporarily store the user credentials entered by the user, and use them at a later time when retrieving the additional content. In this example, the partner content provider may request the user credentials prior to providing the additional content, at which time the email client may provide the entered credentials. As another example, the user credentials may be entered when the additional content is being retrieved (e.g., prior to actual retrieval), at a request by the partner content provider (e.g., or a site providing the additional content). It will be appreciated that, as another example, the user credentials can be stored remotely (e.g., on a server) either in whole or in part. That is, the credentials can be stored remotely (e.g., remote from the client), or some (part) of the credentials may be stored locally while some (part) of the credentials may be stored remotely.

In one embodiment, the metadata can comprise display properties for the additional content, such as in one or more EEOs stored in a data store. As an example, an "active view" display for the email can comprise the additional content that is added to the display of the other contents of the email. As described above, for example, an EEO may comprise display size and dimensions for the additional content, and/or the "active view" used to display the additional content. As an illustrative example, the additional content may comprise a sort of "mini-website," text comprising updated information, media (e.g., video, image), and/or a type of active display box comprising updated information. In this embodiment, the display properties for the additional content can be read from the email client data store.

At 316, an inline frame (iframe) can be created that comprises the display dimensions for the additional content, as determined from the metadata in the EEO. For example, an email often comprises a header (e.g., located at a top of the message), and a message body (e.g., below the header). As an example, the email client may look at the EEO and determine what type of user interface (UI) may be used to display the additional content, and/or the active view for the additional content. In one embodiment, UI may comprise an iframe that is disposed between the header and body of the email message, for example, such that the additional content appears to be part of the email message body (e.g., for aesthetics to provide an improved user experience). In another embodiment, the UI (e.g., comprising the iframe) may be disposed in the body of the email, at the end, or some other location based on desired preferences, and/or system limitations, for example.

It will be appreciated that additional content can be displayed in the email in a variety of ways, and is not merely limited to displaying in an iframe. In one embodiment, if the additional content to be displayed in the email is, for example, "trusted" (e.g., comes from a verified, trusted, etc. source) the additional content may merely be displayed in the email body, for example. In one embodiment, a "sandbox" may be created using JavaScript/Jscript and/or the like, that provides a sort of canvas in the email for displaying the additional content. In this aspect, in one embodiment, a display port may be created in the email body that provides for the additional content to be displayed. As an example, the email client can read an EEO to determine the display properties and the type of display port to use to display the additional content (e.g., a web video).

Figure 4:
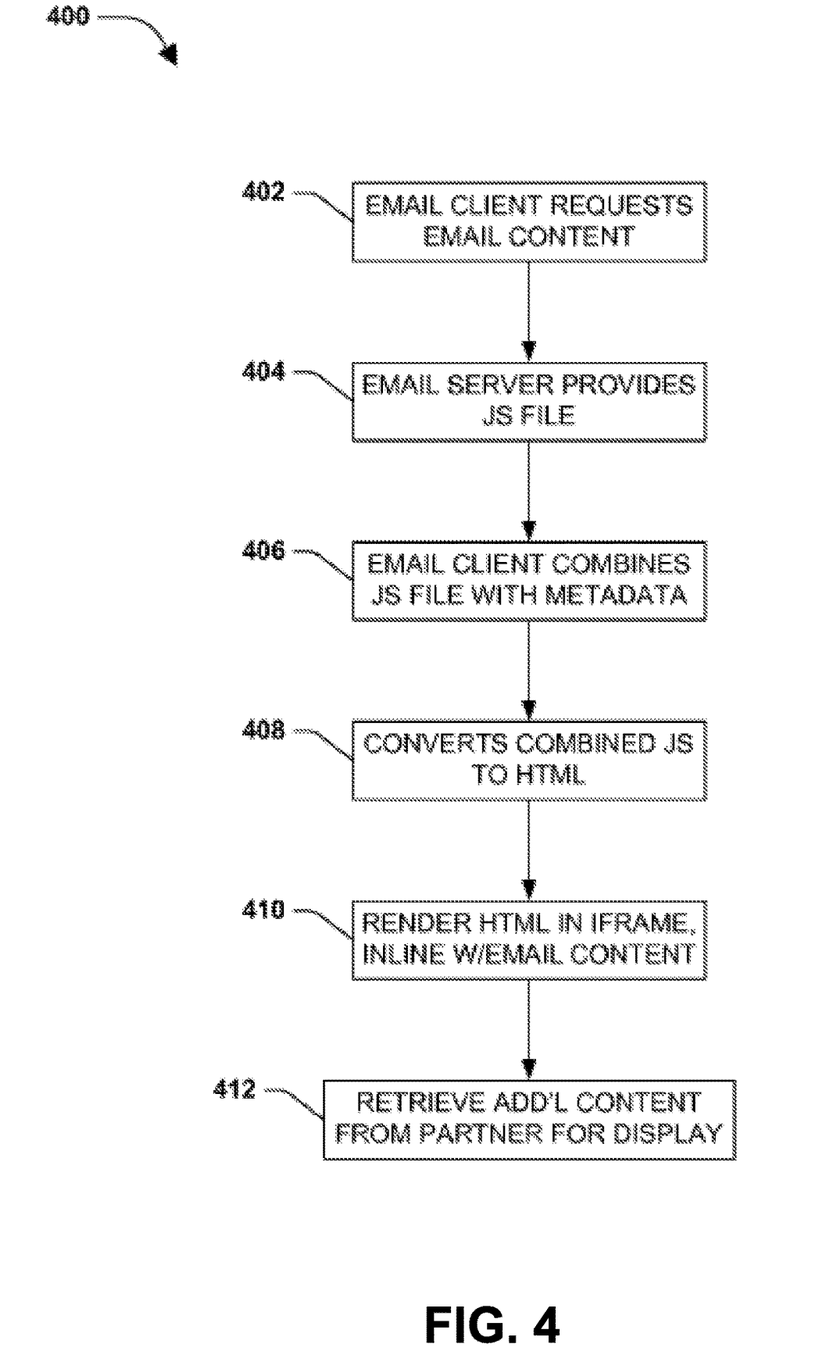
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented. At 402, an email client requests email content for an email accessed by the user, such as when the user opens (e.g., clicks on) the email message in the email client. For example, the contents of the email may be stored at an email service, such as on a remote email server, until the email client asks for "new emails" for the recipient. That is, for example, while the mail may have been sent at anytime prior, the email may not actually be received by the email client until the email client updates the inbox, for example, and/or asks for email contents.

At 404, the email service provides a script file, such as a JavaScript (JS) file, to the email client from an email server. As an example, because the script file may be maintained on the email server, which can be connected to the Internet, the script file may be updated at anytime (e.g., scheduled intervals, and/or at a time the file is requested) with updated content for the email. For example, the email may comprise a partner content provider that has changed a way (e.g., or URI) for retrieving the additional content since the email was actually sent. In this example, the script file may be updated to accommodate changes to a way the additional content is retrieved (e.g., new location, and/or API for retrieving content).

At 406, the email client can combine the script code file with the metadata for the one or more parameters from the email. In one embodiment, the script code in the script file can activate an active view display in the email (e.g., in an inline frame). Further, in this embodiment, the metadata (e.g., from an EEO) can comprise a parameter used to identify (e.g., and retrieve) the additional content. For example, the email may comprise results for a sports tournament that has not ended, and the metadata can comprise a parameter indicating the partner content provider of the sports results, and a parameter indicating the tournament results. In this way, for example, the active view may be rendered in the email message comprising the additional content, such as up-to-date scores/results. In another embodiment, the active view may also comprise a UI that allows the user to interact with the content in the email, such as to view additional details of the tournament in a mini-website in the email (e.g., expand/collapse functionality).

At 408 in the example embodiment 400, the combined script code and metadata can be converted to hypertext markup language (HTML), so that it may be rendered in the iframe, in line with the email content (e.g., in the body of the email), at 410. As an example, the email client can create the iframe in the email and the HTML for the script code retrieved from the email server can be hosted in the iframe. As an illustrative example, the script code, converted to HTML for rendering in the email, may provide a UI that displays updated information, and/or additional content (e.g., media files) provided by the partner content provider.

At 412, the script code may activate retrieval of the additional content from the partner content provider. Alternately, the script code may activate retrieval of the additional content from the email server (e.g., and/or from a third-party site). For example, the combined script code may be rendered in the iframe in the email, which may comprise an active view that can be updated, and/or interacted with, to retrieve additional content. As an illustrative example, the updated sports scores may not be retrieved until the combined script code is rendered as HTML, which can trigger retrieval of the updated scores from the partner content provider, thereby providing up-to-date information.

As an illustrative example, in FIG. 5, when an email client application 508 opens/activates updates for an email, the email client application 508 can read 554 EEOs from the local email client data store 506. After reading parameters comprised in the EEOs, the email client 508 may create an inline frame for rendering in the email message display. Concurrently (e.g., or subsequently), for example, the email client 508 may send a request 556 to an email update server 510, of the email service, for the email contents.

In this example embodiment 500, the email update server can check for an updated version of the information in the email, such as from the partner content provider, and update a JavaScript file for the email. The JS file can be sent 558 back to the email client 508 in response to the request 556. Further, the email client can combine the JS file with the parameters read 554 from the EEOs, and convert the combination into HTML. The HTML can be rendered in the iframe created in the email body, which may further request additional content from the partner content provider, if activated by the JS code.

A system may be devised that can facilitate provision of additional content in an email, using an email client that may not be associated with a particular email provider. For example, an email comprises content that was created at the time of authoring of the email. In this example, additional content, such as updated information, interactive content, previews of attachments, media, etc., may be added to the original content when the email is opened by the recipient. A partner content provider can be identified in the email, and up-to-date content can be provided by the partner at a time of opening, for example, such that the email can comprise the most recent information (e.g., package tracking info).

Figure 6:
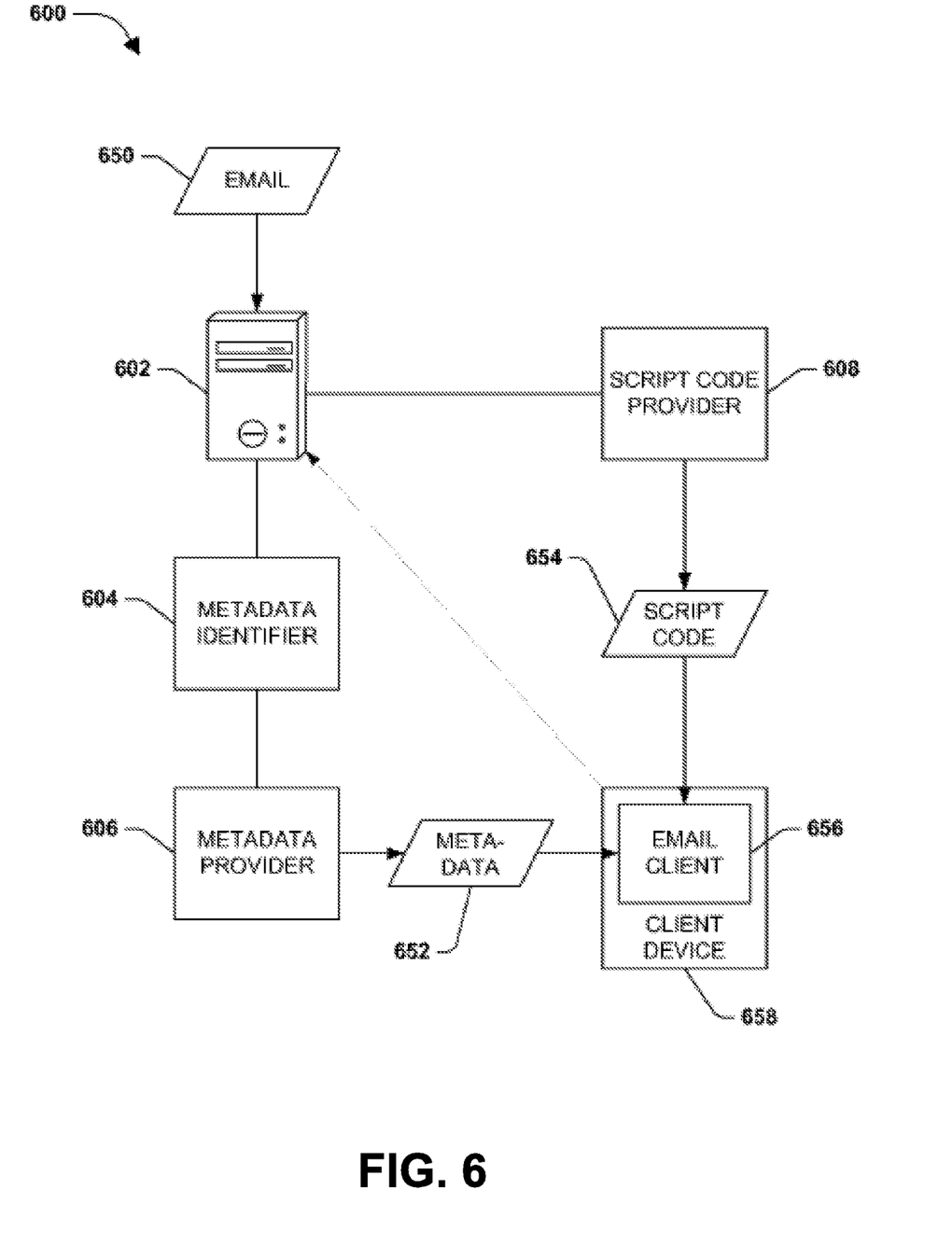
FIG. 6 is a component diagram illustrating an exemplary system for providing additional content in an email accessed by an email client.

FIG. 6 is a component diagram illustrating an exemplary system 600 for providing additional content in an email accessed by an email client. An email server 602 is configured to receive an email 650, and is operably coupled with a metadata identification component 604. The metadata identification component 604 analyzes the email 650 to identify metadata indicative of a parameter that is used to retrieve the additional content for the email 650. In one embodiment, the parameter may comprise an indication of a partner content provider, where the partner content provider can provide the additional content for the email, such as over the Internet. In one embodiment, the parameter may comprise an indication of partner content provider information, comprising the additional content provided by the partner content provider. For example, a first parameter may comprise an enterprise providing package delivery (e.g., comprising a URI for the enterprise) and a second parameter may comprise package delivery information (e.g., comprising a link to a package tracking component).

A metadata providing component 606 is operably coupled with the metadata identification component 604 to provide the metadata 652 to the email client 656. The email client 656 is operating on a client device 658 that is associated with a recipient of the email 650, and the metadata 652 is provided to the email client 656 prior to the email 650 being accessed by the email client 656. For example, the metadata identified by the metadata identification component 604 can be provided to the email client 656 before the intended recipient of the email actually accesses contents of the email (e.g., opens the email).

A script code providing component 608 is operably coupled with the email server 602 to provide script code 654 to the email client 656 in response to an indication that the email 650 has been accessed by the email client 656 (e.g., opened). Here, the script code is configured to activate retrieval of the additional content based at least in part upon the parameter indicated by the metadata 652. For example, the email client 656 may connect to the email server 602, through the client device 658, to request the contents of the email, such as when the recipient opens the email client 656 to read new messages. In response, the script code providing component 608 can provide the script code 654 to the email client so that the additional content can be retrieved and loaded into the email message when opened.

Figure 7:
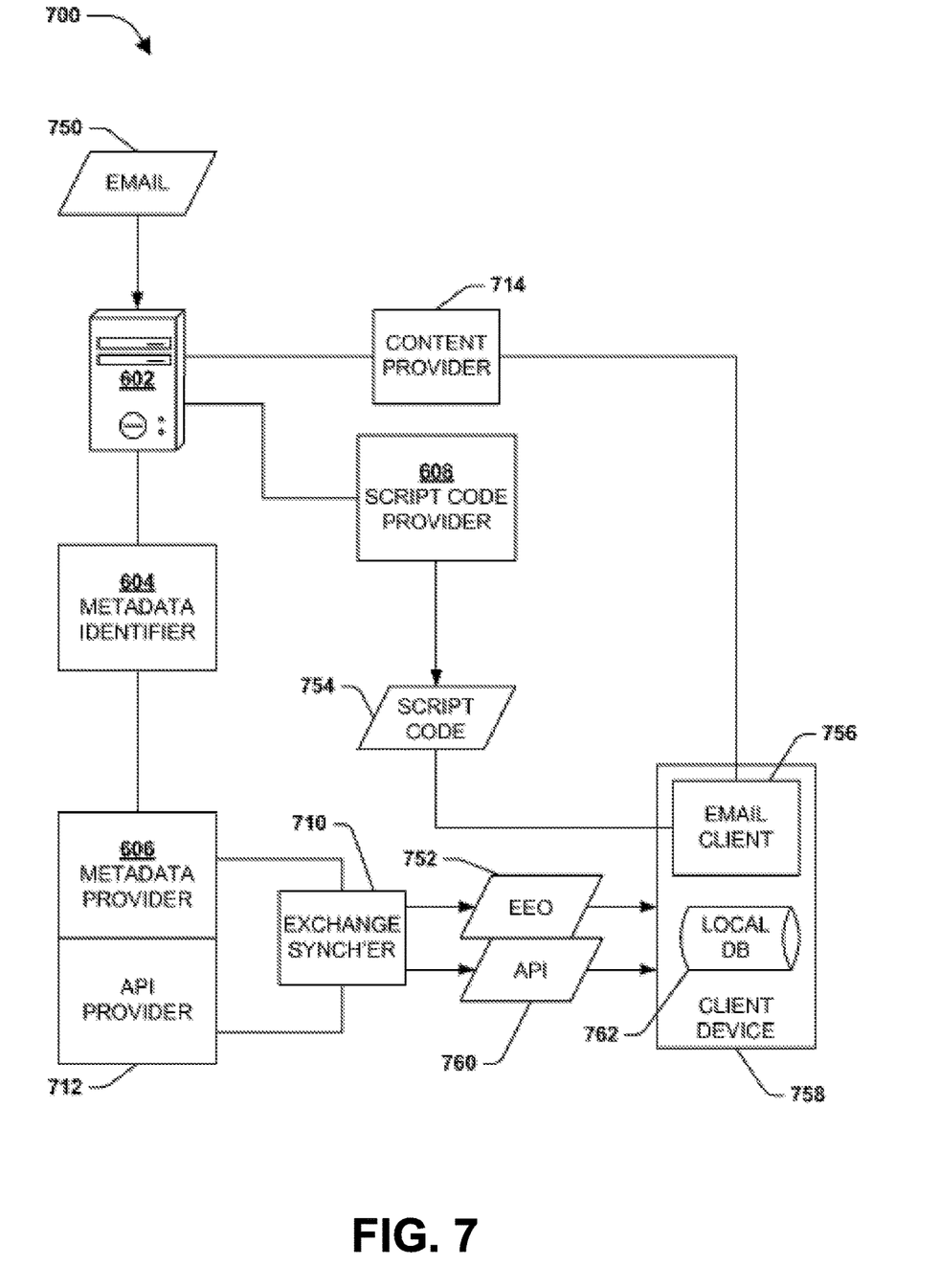
FIG. 7 is a component diagram illustrating an example embodiment where one or more systems described herein may be implemented.

FIG. 7 is a component diagram illustrating an example embodiment 700 where one or more systems described herein may be implemented. In this example, an extension of FIG. 6 is provided and thus description of elements, components, etc. described with respect to FIG. 6 may not be repeated for simplicity. Metadata sent to an email client 756 regarding an email 750 can comprise an extensible email object 752 (EEO) that may be synchronized to a local database 762 of a client device 758. Further, the EEO can comprise one or more parameters that are used to render an in-line frame (iframe) comprising additional content for the email. An application programming interface (API) providing component 712 can provide an API 760 to the email client 756. Additionally, the API 760 can be used to retrieve script code 754 that provides the additional content from a partner content provider using a parameter indicated by the metadata. In one embodiment, the API provider may be coupled with (e.g., or comprise) the partner content provider to provide an API for retrieving the additional content from the partner content provider.

An exchange synchronization component 710 can synchronize the metadata, such as in an EEO 752 comprising the metadata, between the email server 602 and the client device 758 running the email client 756. Further, the exchange synchronization component 710 can synchronize an API 760 to the client device. For example, the exchange synchronization component 710 may provide updated EEOs and/or APIs for the email client 756, which can be stored locally on the client device 758 in a local data store 762, for example.

Upon receipt of an indication by script code 754 running in the email client accessing the email 750, a content providing component 714 can provide the additional content to the email client 756. In one embodiment, the script code providing the indication can comprise at least some of the additional content indicated by the metadata, such as in an EEO 752, provided to the email client 756. For example, the script code can be combined with one or more parameters and converted to hypertext markup language (HTML) for rendering in the email client 756. The script code, running as HTML, may call for the additional content, such as from the content provider 714, which may comprise the email service, a partner content provider, and/or a third party site providing data, for example.

Figure 8:
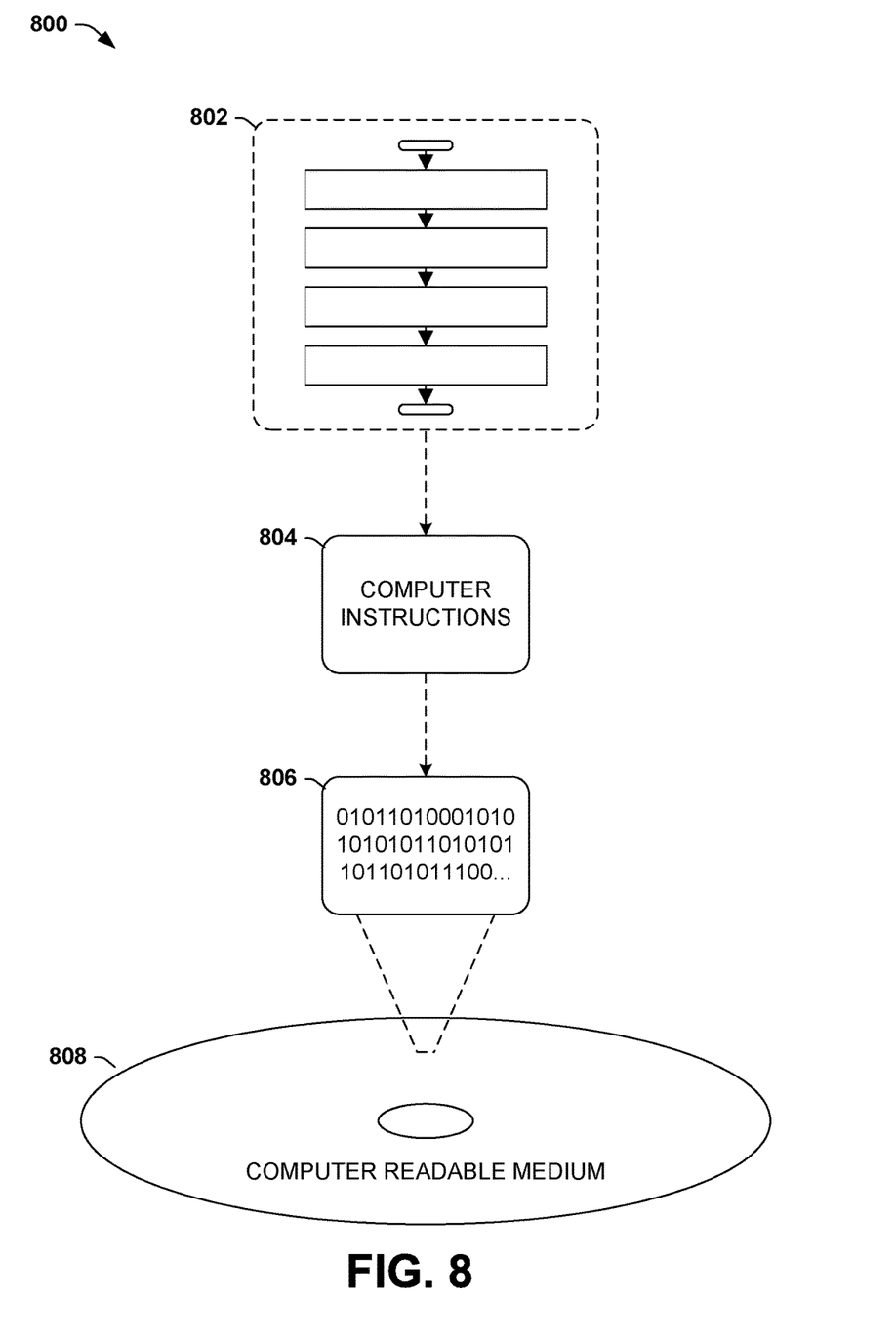
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 100 of FIG. 1, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
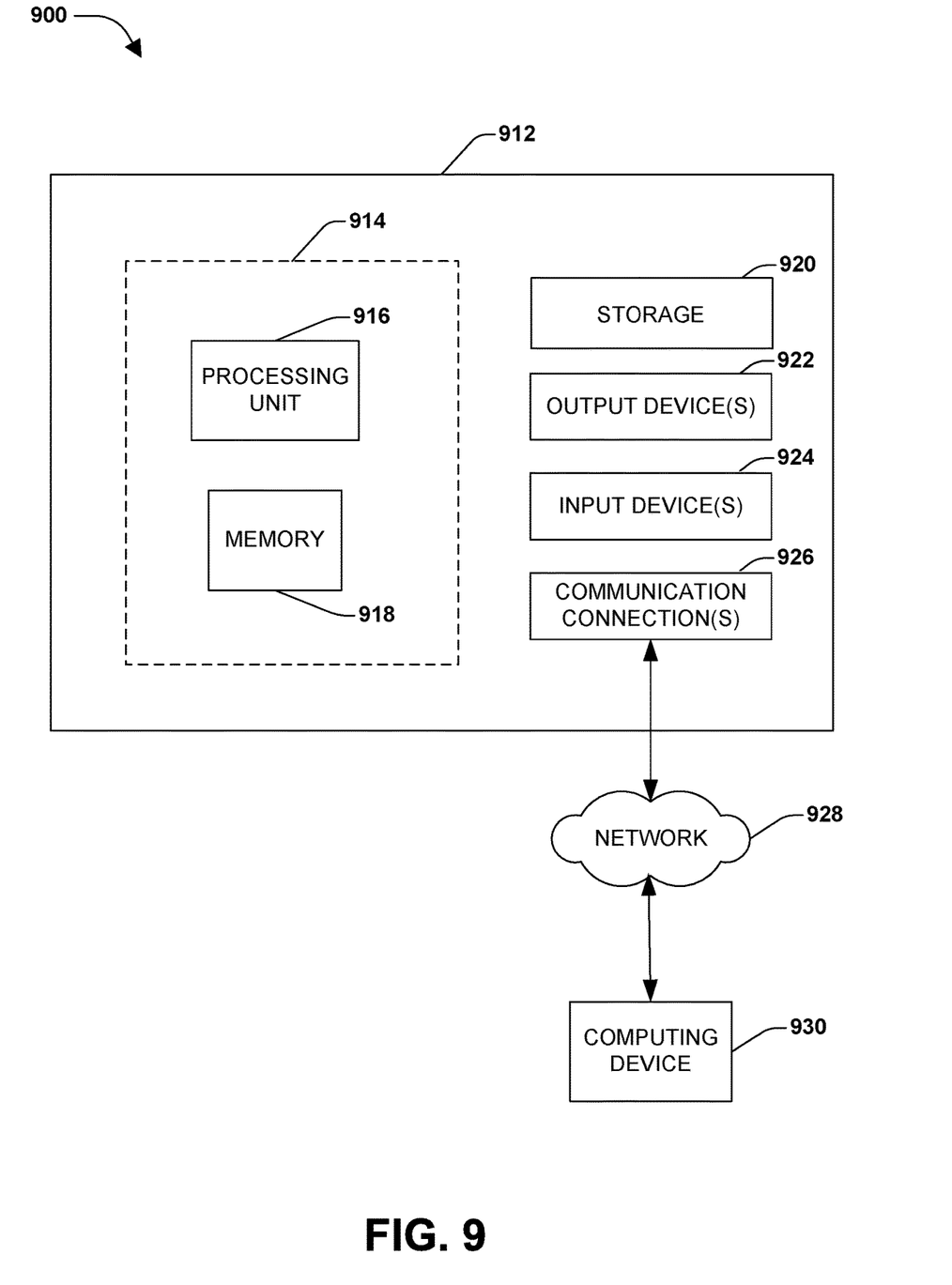
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:
1. A computer-based method for providing additional content in an email, comprising:

identifying metadata of the email received at an email server, the metadata being indicative of a parameter used to retrieve the additional content, the identifying metadata including at least:
- analyzing the email to identify a partner content provider; and
- analyzing the email to identify metadata associated with the partner content provider;

providing the metadata from the email server to an email client prior to the email being opened by the email client;

returning a first instance of script code from the email server to the email client in response to receiving an indication of the email client accessing the email, the first instance of the script code providing a first state of the additional content;

returning a second instance of the script code from the email server to the email client in response to receiving a second indication of the email client accessing the email, the second instance of the script code providing a second state of the additional content, the second state different than the first state; and providing at least one of the first instance or the second instance of the script code for hosting in an inline frame (iframe) of a user interface (UI) of the email client such that the additional content appears to be part of a message content of the email.

2. The method of claim 1, further comprising providing an application programming interface (API) to the email client, the API configured to access at least one of the first instance or the second instance of the script code.

3. The method of claim 1, wherein identifying metadata of the email received at an email server comprises:
identifying metadata of the email received at an email server, the metadata being other than a Uniform Resource Locator (URL) or a hyperlink.

4. The method of claim 1, the email client comprising a web-based email client.

5. The method of claim 1, wherein analyzing the email to identify metadata associated with the partner content provider comprises identifying the parameter used to retrieve the additional content.

6. The method of claim 1, further comprising receiving an indication of an activation from the script code of an active view for the email in the email client.

7. The method of claim 6, the active view comprising one or more of:
the additional content; or
a user interface (UI) for interacting with content in the email.

8. The method of claim 1, further comprising receiving an indication of an activation of a prompt for user authentication if the parameter indicates user authentication is used for the additional content.

9. The method of claim 1, further comprising receiving an indication of an activation from at least one of the first instance or the second instance of the script code after the email has been opened by the email client for retrieval of the additional content from the email server.

10. The method of claim 1, wherein returning at least one of the first instance or the second instance of the script code from the email server to the email client is responsive to an initiating of an opening of the email by the email client.

11. The method of claim 1, further comprising facilitating a rendering of a combination of the script code and one or more parameters in the user interface.

12. The method of claim 1, wherein providing the metadata from the email server to an email client comprises synchronizing the metadata to a client device comprising the email client prior to the email being opened by the email client.

13. The method of claim 1, wherein providing the metadata from the email server to an email client comprises providing an extensible email object to the email client during an exchange synchronization event between the email client and the email server prior to the email being opened by the email client.

14. A system, implemented at least in part via a processing unit, for providing additional content in an email, comprising:
an email server configured to receive an email;
a metadata identification component configured to analyze the email to identify metadata of the email, the metadata indicative of a parameter used to retrieve the additional content, the identifying metadata including at least:
- analyzing the email to identify a partner content provider; and analyzing the email to identify metadata associated with the partner content provider;
a metadata providing component configured to provide the metadata from the email server to an email client operating on a client device prior to the email being opened by the email client; and
a script code providing component configured to at least:
return a first instance of script code from the email server to the email client in response to receiving an indication of the email client accessing the email, the first instance of the script code providing a first state of the additional content;
return a second instance of the script code from the email server to the email client in response to receiving a second indication of the email client accessing the email, the second instance of the script code providing a second state of the additional content, the second state different than the first state; and
provide at least one of the first instance or the second instance of the script code for hosting in an inline frame (iframe) of a user interface (UI) of the email client such that the additional content appears to be part of a message content of the email.

15. The system of claim 14, further comprising an exchange synchronization component configured to synchronize the metadata between the email server and the client device.

16. The system of claim 14, the metadata comprising an extensible email object configured to be synchronized to a local database of the client device.

17. The system of claim 14, further comprising an application programming interface (API) providing component configured to provide an API to the email client, the API configured to access the script code to activate retrieval of the additional content after the email is opened by the email client.

18. The system of claim 14, further comprising a content providing component configured to provide the additional content to the email client after the email is opened by the email client.

19. The system of claim 14, the parameter comprising an indication of a partner content provider, the partner content provider providing the additional content after the email is opened by the email client.

20. A computer readable storage device comprising computer executable instructions that when executed perform a method for providing additional content in an email, comprising:
    identifying metadata in a body, but not a header of the email received at an email server, the metadata indicative of a parameter used to retrieve the additional content, the identifying metadata including at least:
        analyzing the email to identify a partner content provider; and
        analyzing the email to identify metadata associated with the partner content provider;
    providing the metadata from the email server to an email client prior to the email being opened by the email client;
    returning a first instance of script code from the email server to the email client in response to receiving an indication of the email client accessing the email, the first instance of the script code providing a first state of the additional content;
    returning a second instance of the script code from the email server to the email client in response to receiving a second indication of the email client accessing the email, the second instance of the script code providing a second state of the additional content, the second state different than the first state; and
    providing at least one of the first instance or the second instance of the script code for hosting in an inline frame (iframe) of a user interface (UI) of the email client such that the additional content appears to be part of a message content of the email.

\* \* \* \* \*